March 16, 1943.   T. G. LE CLAIR   2,313,752

AUTOMATIC PRINTING METERING SYSTEM

Filed April 13, 1938   6 Sheets-Sheet 1

Fig. 1.

Inventor:
Titus G. LeClair
By: [signature]
Attys.

March 16, 1943.  T. G. LE CLAIR  2,313,752
AUTOMATIC PRINTING METERING SYSTEM
Filed April 13, 1938  6 Sheets-Sheet 2

Fig. 1A.

Inventor:
Titus G. LeClair

March 16, 1943.  T. G. LE CLAIR  2,313,752
AUTOMATIC PRINTING METERING SYSTEM
Filed April 13, 1938  6 Sheets-Sheet 3

Fig. 2.

Inventor:
Titus G. LeClair

March 16, 1943. T. G. LE CLAIR 2,313,752
AUTOMATIC PRINTING METERING SYSTEM
Filed April 13, 1938 6 Sheets-Sheet 4

Inventor:
Titus G. LeClair

March 16, 1943.    T. G. LE CLAIR    2,313,752
AUTOMATIC PRINTING METERING SYSTEM
Filed April 13, 1938    6 Sheets-Sheet 5

Patented Mar. 16, 1943

2,313,752

UNITED STATES PATENT OFFICE 2,313,752

AUTOMATIC PRINTING METERING SYSTEM

Titus G. Le Clair, Chicago, Ill.

Application April 13, 1938, Serial No. 201,787

21 Claims. (Cl. 234—5.5)

This invention relates to metering systems, and has to do with systems for determining and recording a characteristic of electrical circuits or other systems or apparatuses.

My invention is directed to a system for automatically scanning an electrical circuit or an apparatus at predetermined intervals, determining the value of a desired characteristic thereof, and producing a printed record of the values so determined. More specifically, it is directed to means whereby a plurality of circuits or apparatuses may be automatically scanned successively at predetermined time intervals, the values of the desired characteristic of the respective circuits or apparatuses thus determined being printed as and in the order determined, providing a permanent printed record for future reference and comparison. Further objects and advantages will appear from the detail description.

In the drawings:

Figure 4 is a face view of two connected sheets of a strip of paper forms intended for use in the typewriter, one of which has a record printed thereon, these forms being intended for recording the current loads of electrical circuits.

In general, the various pieces of equipment used in the system of my invention are of known type and detailed description of the construction thereof is unnecessary and may be omitted to advantage, with a view to conciseness and clarity of description of the system.

I have illustrated, by way of example, the use of a typewriter as the recording and printing instrumentality. Any suitable typewriter may be employed. Preferably, I use a Burroughs typewriter having a motor for returning the carriage to starting position, means controlling the operating connection between the motor and the carriage, and a carriage return key operatively connected to the control means and effective, when actuated, for returning the carriage to starting position by the motor and feeding a sheet of paper a predetermined distance through the machine. That machine has a standard keyboard, including ten number or digit keys, and is provided with a spacer bar, as usual. To this typewriter I have added certain mechanisms adapting it to use in the system of my invention. The typewriter itself is of known construction, as above noted, and a brief description thereof will suffice.

Figure 2:
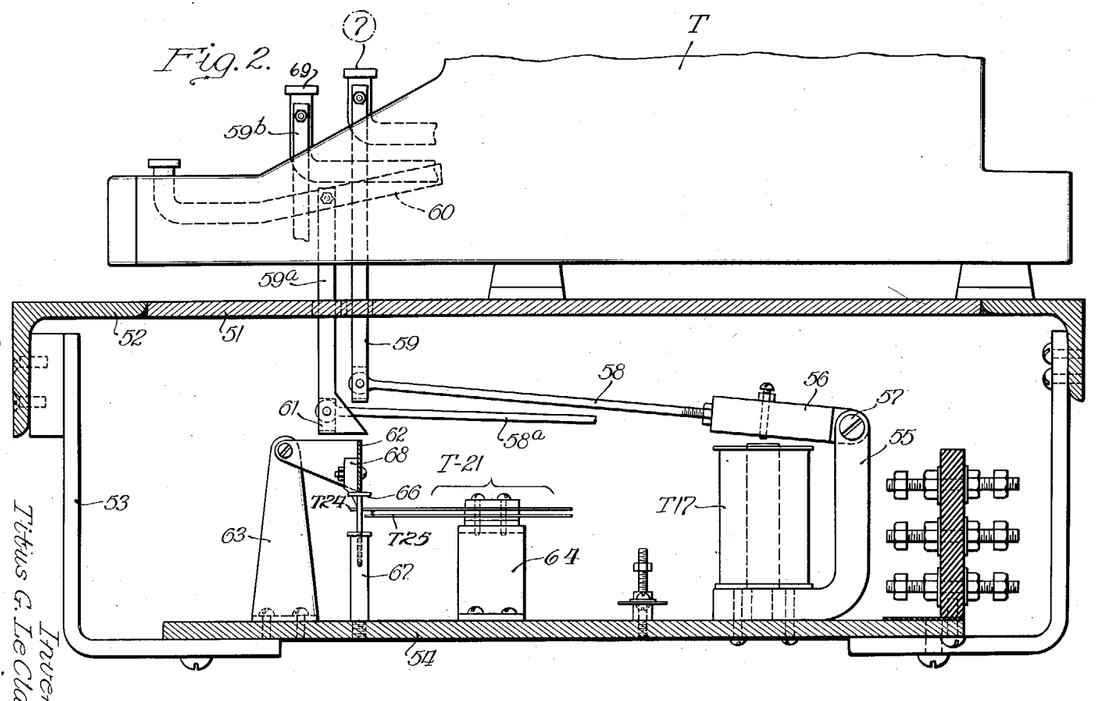
Figure 2 is a semi-diagrammatic side view of a typewriter used in the system of my invention, and appurtenant mechanisms carried by a base structure supporting the typewriter, the base structure being shown in section, the section thereof being taken substantially on line 2—2 of Figure 3, certain parts being shown in elevation.
Figure 3:
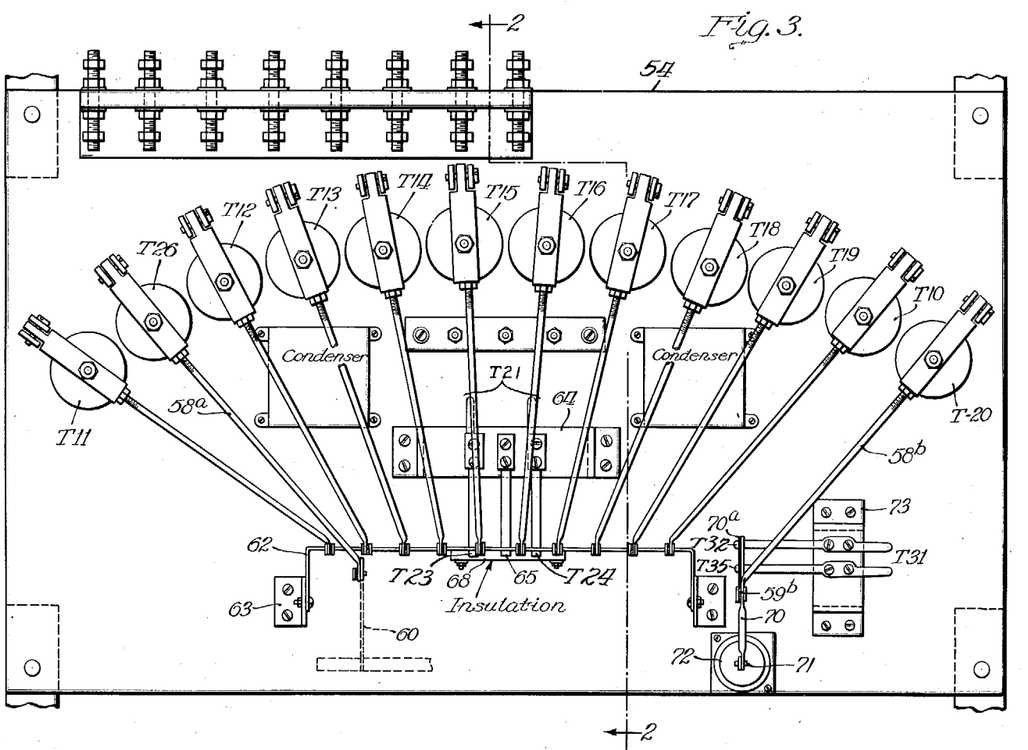
Figure 3 is a plan view of the base structure and the parts carried thereby.

Referring to Figures 2 and 3, a typewriter T is mounted upon top plate 51 welded in a frame 52, the latter supporting, by brackets 53, a panel 54. Twelve solenoids, T10 to T20, inclusive, and T26, are mounted upon panel 54, each mounted on a magnet steel bracket 55 of approximately L-shape. Each solenoid has associated therewith an armature 56 pivoted at its rear, at 57, to the upper end of bracket 55. A rod 58 is adjustably secured in and extends forward from armature 56, the solenoids being disposed adjacent the rear of the typewriter.

Rod 58 of solenoid T17 is connected at its forward end, by a link 59, to one of the digit keys of the typewriter, specifically, the key numbered "7". In like manner, the rods 58 of solenoids T11, T12, T13, T14, T15, T16, T18, T19, and T10 are connected by links 59 to digit keys 1, 2, 3, 4, 5, 6, 8, 9 and 0, respectively, of the typewriter, plate 51 being provided with appropriate openings accommodating the links. The digits keys of the typewriter are all in the same row, at the top of the keyboard, as usual, aligned lengthwise of the typewriter, the links 59 being similarly aligned.

Rod 58a of solenoid T26 extends forwardly a short distance beyond the rods 58 and has its forward end connected, by a link 59a to spacer bar arm 60 of the typewriter. Link 59a is provided, at its lower end, with a rearwardly extending foot 61, for a purpose which will appear presently.

A yoke 62, of elongated U-shape in plan, is pivotally mounted at its ends on brackets 63 secured to base panel 54. Links 59 and the rearward portion of foot 61 of link 59a overlie the bight portion of yoke 62, which overlies two sets of switch contacts T22—T23 and T24—T25 of known type, together forming a multi-contact switch T21. The latter is mounted upon and appropriately insulated from a supporting bracket 64 secured to base panel 54. A leaf spring 65 (Figure 3), also secured to bracket 64, extends beneath the bight portion of yoke 62 and normally holds it in raised position. Downward movement of the yoke is limited by a stop 66 adjustably mounted in a standard 67 secured to base panel 54. A strip of insulation 68 is secured to the midportion of the bight element of yoke 62 and extends therebelow for contact with the upper spring elements of the switch T21. In the normal position of yoke 62, contacts T24 and T25 of switch T21 are in open circuit position, and contacts T22 and T23 are in closed circuit position. The downward travel of links 59 and 59a, responsive to energization of the corresponding solenoids, is such as to depress yoke 62 sufficiently to cause momentary closing of the normally open contacts T24—R25 and opening of the normally closed contacts T22—T23, of switch T21. Accordingly, the switch T21 is operated whenever any one of the digit key solenoids or the spacer bar solenoid is energized. The reason for that will appear later, in connection with the description of the operation of the system.

Rod 58b of solenoid T20 is connected by link 59b to the carriage return key 69 of the typewriter, and is provided with a forward extension 70 connected at its forward end, at 71, to a dashpot 72 of known type, mounted on base panel 54. A strip of insulating material 70a is secured to link 59b and projects rearward therefrom, serving to actuate the movable contacts of the sets of switch contacts T32—T33, T34—T35, and T35—T36 of known type, together constituting a multi-contact switch T31, mounted on and appropriately insulated from a bracket 73 secured to base panel 54. In the normal raised position of rod 58b two sets of contacts T32—T33 and T35—T36 of switch T31 are open and a third set of contacts T34—T35 of this switch is closed. When solenoid T20 is energized, with resulting depression of rod 58b, strip 70a closes the two sets of open contacts T32—T33 and T35—T36 of switch T31 and opens the third set of closed contacts T34—T35. The dashpot 72 provides a desirable time delay with respect to opening of this switch, which is desirable for permitting return of the typewriter carriage to starting position preliminary to continued operation of the system. If the carriage is out of starting position, depression of the return key 69 actuates the motor control for returning the carriage to initial position, and also actuates the feed roll of the typewriter for advancing the paper therein a predetermined distance or space. With the carriage in starting position, the paper is advanced an additional space, for each depression of the return key 69. The return of the carriage to initial position, by motor power, and feeding of the paper through the typewriter, under control of the return key 69, are known in the typewriter referred to and need not be further described here.

In Figure 4 I have shown fragmentarily a record strip 75 for use in the system of my invention. It comprises a plurality of forms or sheets 76 connected together end to end, with a line of perforations 77 between adjacent strips for tearing them apart. Each form may be divided into columns, with appropriate headings and time indications for showing the time of printing of an entry, space being provided at the top for the date and space being provided at the bottom for the entry of appropriate notations, as shown in Figure 4. The particular form used will depend upon the information it is desired to record, the apparatus or circuit under observation, and related factors, as will be understood. The forms shown, by way of example, are intended for recording the ampere loads of electric circuits. The paper strip of forms may be of considerable length, arranged in a roll or stack, and supported in any appropriate manner adjacent the typewriter for feeding thereto the forms as required.

Figure 1:
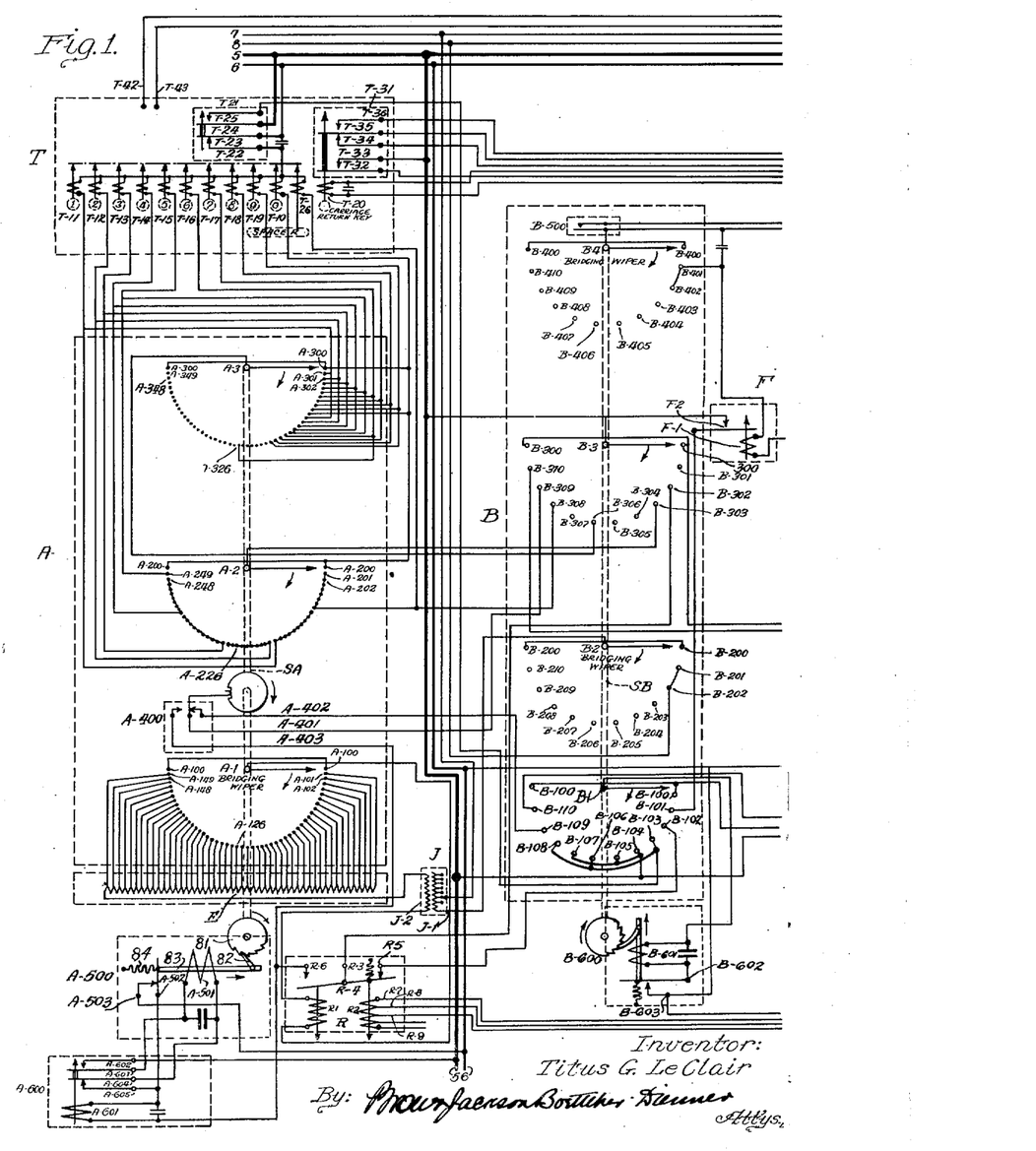
Figures 1 and 1A together constitute a diagrammatic illustration of an automatic printing metering system embodying my invention.
Figure 1A:
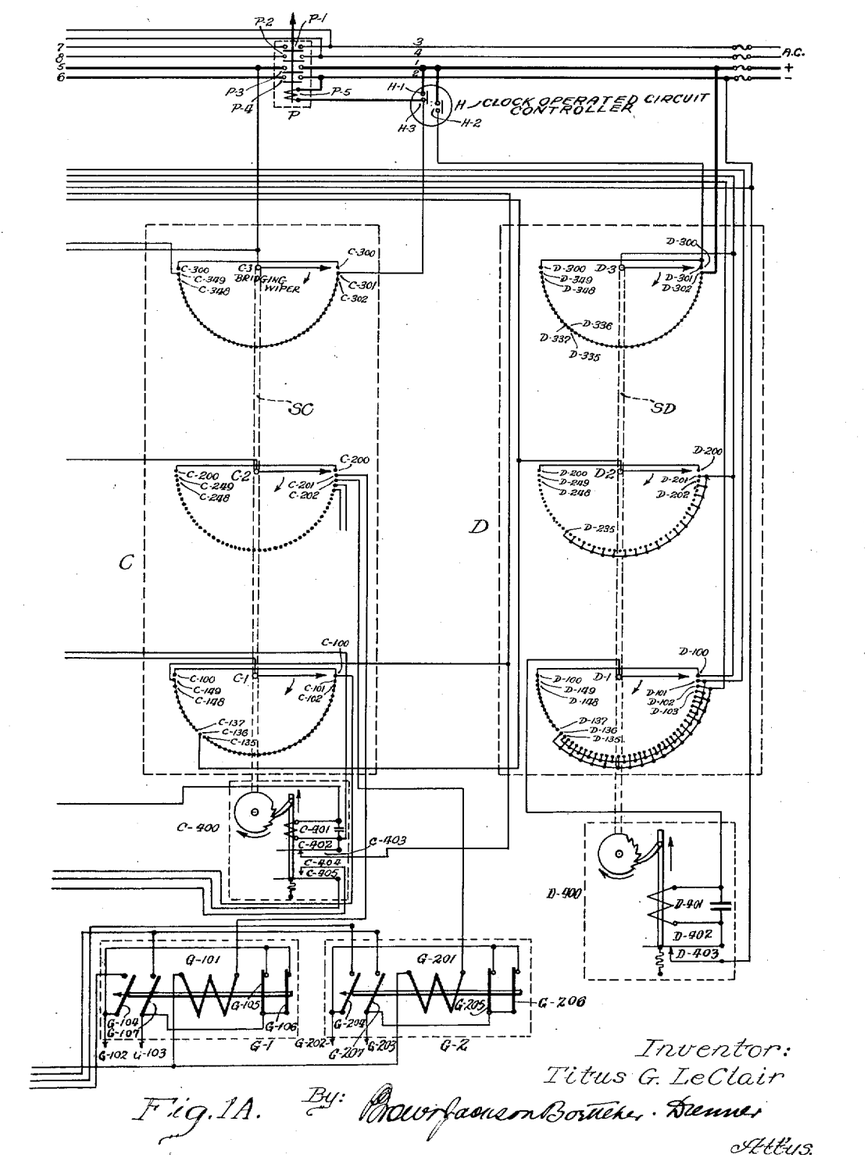

It will be helpful to an understanding of the system of my invention to consider briefly, first, certain other equipment used therein, shown diagrammatically in Figures 1 and 1A.

The time at which readings are taken on the meter is determined by the clock operated circuit controller H. This circuit controller has two sets of contacts—one set of contacts H1 is closed by the clock at arbitrary time intervals, such as every fifteen or thirty minutes; the second set of contacts H2 makes a connection once every twenty-four hours.

The power supply contactor P is used to close the power supply circuit to the meter equipment. It has four sets of contacts which close the direct current and the alternating current supply at suitable voltage.

The power supply to operate the carriage return motor is connected through the points T42 and T43 to the internal mechanism of the typewriter. The mechanism of the typewriter by which the motor is controlled, the carriage returned, etc., is known, as above stated, and need not be described in greater detail.

A rotary switch A is used to supply a varying current to a balancing relay (described later), and to select the proper keys for the operation of the typewriter. This rotary switch consists of three rotating arms A1, A2 and A3, all connected to the same shaft SA, so that their relative positions are fixed. The rotary arm A1 is connected successively to contacts A100 to A149, inclusive, as the switch rotates through its complete circle in a forward direction, indicated by the arrow. The contacts A100 to A149 are shown diagrammatically as arranged in a semi-circle. In actual construction, these contacts are arranged in a circle, and contact A100 is adjacent contact A149, so that the rotation of the arm A1 by steps in a complete circle leaves this arm always connected to one of the fifty stationary contacts.

The arm A2, rotating in a forward direction, makes contact successively with the points A200 to A249, inclusive. The rotating arm A3 makes contact successively with the points A300 to A349, inclusive. The mechanical relation is such that A1 is connected to point A100 at the same time that A2 is connected to point A200, and A3 is connected to point A300; and that all other points exist in the same relation—for example, when A1 is connected to point A126, A2 is connected to point A226 and A3 is connected to point A326. The rotary switch A is equipped with an auxiliary contact switch A400, commonly known as an "off-normal" switch, which makes contact from the center connection A401 to the right hand connection A402 when the rotary switch is in the zero or neutral position. In any other position, this auxiliary switch makes contact from A401 to the left-hand contact A403. The zero or neutral position is where A1 is connected to A100, A2 is connected to A200 and A3 is connected to A300. The forward motion of the rotary switch is accomplished by a ratcheting device which is only shown diagrammatically and may be of known type, comprising a ratchet wheel 81 secured on shaft SA and engaged by an appropriately mounted pawl 82 which is operated by a stepping solenoid A500. Energizing the solenoid coil A501 moves the plunger 83 of the solenoid in opposition to a spring 84, moving the pawl correspondingly. Deenergizing the solenoid coil permits the spring to return the solenoid plunger to its normal position, at the same time moving the three arms of the rotary switch to the next position—for example, from A101 to A102, etc. When the solenoid coil A501 is energized, the contact between points A502 and A503 is opened.

Proper timing of the rotation of the rotary switch is accomplished by a separate timing relay A600. Energizing the coil A601 of relay A600 causes closing of the contact between points A602 and A603 and opening of the contact between A604 and A605. The balancing relay R is equipped with two coils R1 and R2. Energy in either of these coils pulls on the balancing arm R4 in the direction of the arrows. Arm R4 connects the plungers of the two coils and is balanced at its center connection R3. When no current is flowing through either coil, arm R4 is in such position that it completes a circuit from R3 to R5, to which position it may be biased by gravity, spring means, or in any other suitable manner. If the pull exerted by the coil R1 exceeds the pull of coil R2, the arm R4 completes the circuit from point R3 to R5. If the pull of coil R2 exceeds that of coil R1 and overcomes the bias of the spring means, the arm R4 completes the circuit from R3 to R6.

Coil R2 of the balancing relay is connected to one or more metering busses, R7, R8, R9, etc. These metering busses are connected to various taps on the coil R2, in order to obtain a varying pull on the solenoid when the instrument is used for measuring current in circuits of different magnitude.

An impeder, shown as a resistor E, is provided and has a plurality of taps respectively connected to the points on the rotary switch form A101 to A149, inclusive. The taps on this resistor are so arranged that when the arm A1 moves in a forward direction, each step forward cuts out one portion of the resistor. Any other suitable form of variable impeder may be used.

A transformer J has its primary coil J1 connected to the source of alternating current supply through contacts P1 and P2 of the power supply contactor P. One end of primary coil J1 has connection with contacts P1 directly through bus 7, and the other end of said primary coil J1 is adapted to have connection with the other contacts P2 through switch arm B2 and contacts B—201, B—202 of rotary sequence switch B (to be later described), and thence through bus 8. The secondary coil J2 of transformer J supplies current to the coil R1 of the balancing relay R, in series with the tapped resistor E and the rotary switch arm A1. In practice primary winding J1 is provided with compensating taps by means of which the output voltage of coil J2 may be adjusted to that value at which the system is intended to operate. Assuming that the system is calibrated with 110 v. connected to the 110 v. tap of coil J1, and an output voltage of 50 v. for coil J2, and the available A.-C. power supply is 112 v.; the power supply is connected to the 112 v. tap of coil J1 thus maintaining the desired output voltage of coil J2. In like manner, the A.-C. power supply is connected to the proper tap of coil J1 to give the correct output voltage for coil J2, for any other value of A.-C. supply voltage.

A rotary sequence switch B has four arms, B1, B2, B3 and B4, connected to the same shaft SB in the same manner as described for rotary switch A. As this switch moves in a forward direction, the arm B1 connects successively to contacts B100 to B110, inclusive, arm B2 connects to contacts B200 to B210, arm B3 connects successively to contacts B300 to B310, and arm B4 connects successively to contacts B400 to B410. This rotary switch is equipped with an auxiliary switch B500 whose contacts are opened when the arm B4 is in the home position or connected to B400. In all other positions of arm B4 the contacts of the auxiliary switch B500 are closed.

The forward rotation of the rotary switch B is accomplished by a stepping solenoid B600, in the same manner as described for rotary switch A and its stepping solenoid A500.

A circuit selector switch C has three arms, C1, C2 and C3, connected on the same shaft and operated together in the same manner as described for rotary switch A. This rotary switch C has three sets of contacts—from C100 to C149, inclusive, from C200 to C249, inclusive, and from C300 to C349, inclusive. This circuit selector switch is moved in a forward direction step by step by the stepping solenoid C400 in the same manner as rotary switch A is moved forward by the stepping solenoid A500. This stepping solenoid C400 is equipped with auxiliary contacts C402–C403 and C404–C405. When the coil C401 is energized, the motion of the solenoid breaks the connection between C402 and C403 and makes the connection between C404 and C405.

A rotary heading-advance switch D has three arms, D1, D2 and D3. These three arms are connected to the same shaft and held in the same relative positions in the same manner as described for rotary switch A. The arm D1 makes contact successively with points D100 to D149, inclusive, arm D2 makes contact successively with contacts D200 to D249, inclusive, and arm D3 makes contact successively with contacts D300 to D349, inclusive. This rotary switch D is equipped with a stepping solenoid D400 which moves the arms in a forward direction, in the same manner as described for rotary switch A.

A series relay F has a relatively low resistance coil F1. When current flows through the coil F1, the contacts F2 are closed.

For each circuit to be metered there is a plugging in relay G1, G2, etc. For plugging relay G1, points G102 and G103 are connected in series with the circuit to be measured. When the coil G101 is not energized, the circuit is closed through contacts G105 and G106 in parallel from the circuit G102 and G103. When the coil G101 is energized, G102 is connected through contact G104 to metering bus R9, and G103 is connected through G107 to metering bus R7, and contacts G105 and G106 are opened.

With all of the rotary switches standing in the zero position or home point, and with the power supply contactor P open, the periodic contact H1 of the clock operated circuit controller H makes contact and completes the circuit from the positive bus 1 to point H3, through the coil P5, to the negative bus 2. This energizes the coil P5 and closes the power supply contactor P, and supplies power to the direct current busses 5 and 6 and the alternating current busses 7 and 8. A circuit is completed from the positive bus 5, through the arm B3, to point B300, through stepping coil C401 of rotary switch C, to the negative bus 6. This energizes stepping coil C401. Raising the plunger of this coil completes the circuit from positive bus 5 through point C404, and the contact of the auxiliary relay to point C405, through point B100 to arm B1, to stepping coil B601 of rotary switch B. From coil B601, the circuit is completed through the contact of the auxiliary relay to B603 to the negative bus 6. Energizing this stepping coil lifts the plunger and breaks the contact through the auxiliary relay, which, in turn, deenergizes the coil B601 and permits the actuating spring 84 to move the arms of rotary switch B to position 1. This, in turn, breaks the circuit to coil C401 when arm B3 moves off point B300. Such permits the actuating spring 84 on rotary switch C to move the arms of that switch to position 1, making the circuit from positive bus 5, through arm C3, to point C301, to point H3, through coil P5, to negative bus 2. This locks up or maintains the circuit to the coil P5 so that the coil is not deenergized when the contact H1 on the clock operated circuit controller opens after its short time contact. The arm C3 is equipped with a bridging wiper which will make contact with the succeeding point before it breaks contact with the point which it is leaving in each forward step of rotation. Therefore, the coil P5 continues to be energized through all positions of the circuit selector switch from point C301 to point C349, inclusive.

In position 1 of switch B, one terminal of primary coil J1 of transformer J is connected to A.-C. bus 7 and the other terminal is connected through arm B2 and point B201 to A.-C. bus 8. In position 1 of the circuit selector switch C, a circuit is completed from bus 5 through arm B4, point B401, coil F1 of series relay F, arm C2, point C201, coil G101 of plugging in relay G1 to negative bus 6. This energizes coil G101 and closes contacts G104 and G107, and opens contacts G105 and G106, so that the circuit to be metered is completed from G102, through G104, metering bus R9, through coil R2 of the balancing relay, to metering bus R7, to G107, and G103. Therefore, the current flowing in coil R2 will be the current in circuit G102–103, which is the first circuit to be measured.

Energizing coil F1 closes the circuit from positive bus 5, through F2, point B101, arm B1, stepping coil B601, point B602, point B603, to negative bus 6. This energizes said stepping coil or solenoid B601. Solenoid 601 breaks its own circuit and permits the spring 84 to move rotary switch B to position 2. On position 2, coil G101 of plugging in relay G1 continues to be energized as before, except that B4 is connected to point B402.

In position 2 of switch B, transformer J continues to be energized through arm B2 and point B202. However, up to this point in the cycle, no current has been caused to flow in coil R1 of relay R, since the circuit of said coil remains open while the switch arm A—1 stands at point A100. Relay R is so constructed that if no current is flowing in either coil, arm R4 makes contact from point R3 to point R5. If the pull due to the current conducted from the load circuit through load coil R2 exceeds the pull due to the current in balancing coil R1, the arm R4 makes contact from R3 to R6. For example, we may assume that a current of 26 amperes is flowing in the circuit from G102, through load coil R2 to G103. The connection will, therefore, be closed from R3 to R6. The circuit will then be made from bus 5 through B3, B302, R3, R6, timing relay coil A601, contacts A502, A503 to bus 6. This energizes coil A601 and completes the circuit from bus 5 through contacts A602, A603, and stepping coil A501, to bus 6. This energizes stepping coil A501. Operation of this solenoid breaks the circuit from A502 to A503 and deenergizes time relay coil A601. This breaks the circuit from A602 to A603, deenergizes stepping coil A501, and permits the spring 84 to move rotary switch A to position 1. This completes the circuit from transformer secondary J2 through the full resistance of resistor E, contact A101, arm A1 and the balancing or measuring coil R1. In this position the current in coil R1 produces a pull of a value which will overcome the pull exerted by load coil R2 when a current of one ampere is flowing through the latter coil.

Deenergizing the stepping coil A501 again completes the circuit from bus 5 through B3, B302, R3, R6, timing relay coil A601, A502, A503 to bus 6, which energizes coil A601, and, in turn, completes the circuit from bus 5 through A602, A603, stepping coil A501 to bus 6. This again energizes stepping coil A501. The operation of this solenoid breaks the circuit from A502 to A503 and deenergizes relay coil A601. This breaks the circuit from A602 to A603 and deenergizes stepping coil A501, permitting the spring to move rotary switch A to position 2. Arm A1, in moving from position 1 to position 2, cuts out a part of the resistance E, so adjusted as to increase the current in balancing coil R1, which produces a pull on its plunger equal to the pull which would be exerted in coil R2 by a current of 2 amperes.

Rotary switch A continues to advance, step by step, as described, until the current in balancing or measuring coil R1 exerts a pull which is greater than the pull due to the current in load coil R2. This moves arm R4, breaking the circuit from R3 to R6, and stopping the rotation of rotary switch A. At the same time, R4 makes contact from R3 to R5. This completes the circuit from bus 5 through B3, B302, R3, R5, B102, B1, stepping coil B601, B602, B603 to bus 6, which energizes coil B601. The solenoid of B601 breaks its own circuit and permits the spring to move rotary switch B to position 3. In position 3 of switch B, the circuit from bus 5 through B4, etc., to plug-in relay coil G101 is broken, which deenergizes G101, and, in turn, short circuits from G102 to G103 and disconnects G102 and G103 from the metering busses R7 and R9. Also, in position 3, arm B2 breaks the circuit of transformer J, deenergizing the latter. It has been assumed, in this example, that the current in the circuit to be measured was 26 amperes. Therefore, rotary switch A stopped in position 26; that is, arm A1 was connected to point A126, arm A2 connected to A226, and arm A3 connected to A326.

In position 3 of sequence switch B, a circuit is completed from bus 5 through B3, B303, A2, A226, coil T12, and points T22, T23 to bus 6. This energizes solenoid T12, which prints the figure "2" on the paper in the typewriter. At the same time, auxiliary switch T21 is mechanically operated by the solenoid T12 to open the circuit from T22 to T23 and deenergize coil T12. Also, the circuit is closed from T24 to T25, making a circuit from bus 5 through T24, T25, B103, B1, stepping coil B601, B602, B603, to bus 6. This moves the selector switch B to point 4, completing a circuit from positive bus 5 through B104, B1, stepping coil B601, B602, B603 to bus 6. moving switch B to position 5. In position 5 a circuit is completed from bus 5 through B105, B1, stepping coil B601, B602, B603 to bus 6, moving the sequence switch B to position 6. In position 6, a circuit is completed from bus 5 through B3, B306, A3, A326, coil T16, T22, T23, to bus 6. This energizes coil T16, causing the typewriter key to print the digit "6" on the paper in the typewriter. At the same time, the solenoid mechanically operates T21, opening the contact from T22 to T23 and closing the contact from T24 to T25, which completes a circuit from bus 5 through T24, T25, B106, B1, stepping coil B601, B602, B603, to bus 6. This moves rotary switch B to position 7. In position 7, a circuit is completed from bus 5 through B107, B1, stepping coil B601, B602, B603, to bus 6, moving switch B to position 8. In position 8 a circuit is completed from bus 5 through B3, B308, coil T26, T22, T23, to bus 6. This energizes solenoid T26 and operates the space bar of the typewriter to leave the space on the paper in the typewriter between adjacent meter readings. At the same time, the solenoid mechanically operates switch T21 to open contact between T22 and T23, de-energizing the solenoid T26. Contacts T24 and T25 are also closed, completing the circuit from bus 5 through T24, T25, B108, B1, stepping coil B601, B602, B603, to bus 6, moving the sequence switch B to position 9. In position 9 a circuit is completed from bus 5 through B3, B309, A401, A403, timing relay coil A601, A502, A503 to bus 6, energizing the timing relay A600. This process is repeated, as previously described, for the forward rotation of rotary switch A until rotary switch A reaches the zero or home position. At this latter position of switch A, auxiliary switch A400 breaks the circuit from A401 to A403 and makes the circuit from A401 to A402. This makes the circuit from bus 5 through B3, B309, A401, A402, B109, B1, stepping coil B601, B602, B603, to bus 6, moving the sequence switch B to position 10. In position 10, a circuit is completed from bus 5 through B3, B310, C1, C101, B110, B1, and stepping coil B601, etc., moving the sequence switch B to the zero or home position.

In the zero position of switch B, a circuit is completed from bus 5 through B3, B300, stepping coil C401 to bus 6. This energizes coil C401 which makes the circuit from bus 5 through C404, C405, B100, B1 to stepping coil B601, etc., moving the sequence switch B to position 1. The deenergization of stepping coil C401 results in the stepping of rotary switch C to position 2. In position 1 of sequence switch B a circuit is completed from bus 5 through B4, B401, coil F1 of series relay F, C2, C202, coil G201 of plug-in relay G2, to bus 6. This energizes coil G201 and connects G202 and G203, which are in series in the second circuit to be measured, to metering busses R7 and R8, causing the current from circuit G202, G203 to flow through load coil R2 of balancing relay R. We shall assume that this second load circuit which connects with plug-in relay G2 normally carries a considerably higher load than the first load circuit which connects with plug-in relay G1. Hence, the shorter section of the load coil R2 which extends between taps R7 and R8 is connected with this second plug-in relay G2.

The sequence is repeated, as previously described, to measure and record on the form in the typewriter the current in each circuit, until all circuits have beeen measured and recorded, up to the last circuit which is connected to the meter typewriter. For the sake of this description, we may assume that there are thirty-six circuits to be measured and recorded. We may, also, assume for this description that the sequence of operation has continued with the sequence switch B making one complete revolution for each reading taken, and the metering switch A making one complete revolution for each reading taken, while the circuit selector switch C moves forward one step for each reading taken.

I will continue the description from the point where rotary switch C is in position 36, rotary switch A is in the position corresponding to the current measured in circuit 36, and sequence switch B is in position 8. In this latter position of switch B a circuit is completed from bus 5 through B3, B308, coil T26, T22, T23, to bus 6. This operates the space bar and, at the same time, completes the circuit from bus 5 through T24, T25, B108, B1, stepping coil B601, B602, B603, to bus 6 to move the sequence switch to position 9. In position 9 of switch B a circuit is completed from bus 5 through B3, B309, A401, A403, timing relay coil A601, A502, A503, to bus 6. This starts the rotation of rotary switch A, as described, until it reaches the zero or home point and breaks the connection from A401 to A403, and makes the connection from A401 to A402. This completes a circuit from bus 5 through B3, B309, A401, A402, B109, B1, stepping coil B601, etc., moving the sequence switch B to position 10. In position 10 of switch B a circuit is completed from bus 5 through B3, B310, C1, C136, coil T20, and finally to negative bus 2 at a point on the line side of the clock operated circuit controller H and power supply relay P. This energizes solenoid T20, which actuates the carriage return key and causes the typewriter carriage to return to the starting point. Simultaneously, the paper is spaced up so that the typewriter is in position to record the next set of readings on the next succeeding line of the paper. Operation of the solenoid T20 also closes the circuit from bus 5 through T33, T32, C403, C402, stepping solenoid C401 to bus 6. This energizes solenoid C401, which breaks its own circuit at C402 and C403, permitting the rotary switch C to move to position 37. With circuit selector switch C in position 37, a circuit is completed from bus 5 through B3, B310, C1, C137, C403, C402, and stepping coil C401, to bus 6. This energizes coil C401, which breaks its own circuit, permitting circuit selector switch C to move to the next position. The process repeats until circuit selector switch C reaches the zero or home point. With switch C on the home point, the circuit is completed from bus 5 through B3, B310, C1, C100, B110, B1, and stepping coil B601, etc., to move sequence switch B to its home or zero position.

In the home position of circuit selector switch C, the connection from bus 5 through C3, C349, H3, and power relay coil P5 to bus 2, etc., is broken. However, a circuit continues to be maintained from bus 5 through B500, H3, and power relay coil P5, to bus 2, until sequence switch B reaches its zero or home position, when B500 opens its contact deenergizing coil P5, which opens the power supply relay or contactor P and completes one cycle of operation of the system.

A variation occurs in the method of recording the reading on an individual circuit in case there is no current flowing in the circuit at the time it is connected to the meter. Assume, for example, that the system is in condition to record the reading for the first circuit, the sequence switch B has just advanced to the position 1, the circuit selector switch C is in position 1, and the metering switch A is in zero position or on the home point. In this case, a circuit is made from positive bus 5 through B4, B401, series relay coil F1, C2, C201, plug-in relay coil G101, to negative bus 6. This energizes solenoid G101 and connects load coil R2 in circuit G102, G103, as previously described. At the same time, the circuit is completed through B2, B201 to energize transformer J, as described. In this position, series relay F completes a circuit from bus 5 through contacts F2, B101, B1, stepping coil B601, etc., advancing the sequence switch B to position 2. In this latter position of switch B there is no current flowing in either coil R1 or coil R2 of the balancing relay R. As previously stated, under this condition arm R4 makes contact through R3 to R5. The circuit is now made from bus 5 through B3, B302, R3, R5, B102, B1, stepping coil B601, etc., advancing the sequence switch B to position 3. Metering switch A has not been caused to rotate. In position 3 of the sequence switch a circuit is made from bus 5 through B3, B303, A2, A200, typewriter coil T10, T22, T23 to bus 6, causing the typewriter to print the figure "0" on the paper. The auxiliary contact T21 operates to complete the circuit from bus 5 through T24, T25, B103, B1, stepping coil B601, etc., advancing the sequence switch to position 4. In position 4 and position 5, a circuit is made from bus 5 through points B104 and B105, respectively, to B1 and stepping coil B601, etc., advancing the sequence switch until it reaches position 6. In position 6, a circuit is made from bus 5 through B3, B306, A3, A300, typewriter coil T10, T22, T23, to bus 6, causing the typewriter to again print the digit "0" on the paper. Auxiliary switch T21 completes the circuit from T5 through T24, T25, B106, B1, stepping coil B601, etc., advancing the sequence switch to position 7. This completes the circuit from bus 5 through B107, B1 and stepping coil B601, advancing the sequence switch to position 8. In position 8 the circuit is completed from bus 5 through B3, B308, coil T26, T22, T23, to bus 6, actuating the space bar of the typewriter to make the space before the reading on the next circuit to be measured. Auxiliary relay T21 makes the circuit from bus 5 through T24, T25, B108, B1, stepping coil 601, etc., advancing the sequence switch to position 9. With reference to this position 9 of sequence switch B, the auxiliary switch A400 of metering switch A has remained in the normal position for the zero or home position of metering switch A, in which position contacts A401 and A402 are closed. Therefore, the circuit is complete from bus 5 through B3, B309, A401, A402, B109, B1, stepping coil B601, etc., advancing the sequence switch to position 10. The operation from here on is exactly as previously described.

It may be assumed, for the purpose of this description, that the paper on which the typewriter records the readings, is a continuous form perforated into sheets of dimensions such that one sheet will be used for the readings to be taken in a calendar day, and the next sheet on the continuous form for the succeeding calendar day, etc. At the end of the day the paper is advanced a definite number of lines in order to position it to record the next series of readings on the correct lines of the following sheet of paper. For example, it may be assumed that the paper should be advanced eighteen lines at the end of one day's readings. This is accomplished in the following manner:

The clock operated circuit controller H is equipped with a second set of contacts H2, which contacts close at a designated time shortly after the end of the calendar day. This completes a circuit from positive bus 1 through H2, D300, D3, D100, D1, stepping coil D401, D402, D403, to negative bus 2. This energizes solenoid D401, which breaks its own circuit, permitting the spring 84 to advance the heading advance rotary switch D to position 1. In position 1 the clock contact H2 is short circuited by completing the circuit from bus 1 through D301, D3, D201, D2, typewriter solenoid T20, to negative bus 2. This energizes solenoid T20, which actuates the carriage return key on the typewriter. The carriage is already in its starting position, so that the effect of the carriage return key is to advance the paper in the typewriter by one line. Operation of solenoid T20 operates auxiliary switch T31, which makes contact from T35 to T36, and completes the circuit from bus 1 through D301, D3, T35, T36, D101, D1, stepping coil D401, D402, D403, to negative bus 2. This energizes coil D401 which, in turn, breaks its own circuit between D402 and D403, causing switch D to advance to position 2. Moving switch D off position 1 breaks the circuit to coil T20 through D201 and D2. This deenergizes solenoid T20. In position 2, the circuit is made from bus 1 through D302, D3, T35, T34, D102, D1, stepping coil D401, D402, D403, to negative bus 2, advancing the rotary switch D to position 3. In position 3, a circuit is made from bus 1 through D303, D3, D203, D2, carriage return coil T20 to negative bus 2. This energizes coil T20, again actuating the carriage return key to advance the paper a second line. At the same time, the auxiliary switch T31 closes contact to complete a circuit from bus 1 through D303, D3, T35, T36, D103, D1, stepping coil D401, etc., advancing the rotary switch to position 4 and breaking the circuit to carriage return coil T20 through the motion of arm D2 off point D203. This sequence of operations is repeated until switch D reaches position 35. In position 35, the circuit is completed from bus 1 through D335, D3, D235, D2, carriage return coil T20 to negative bus 2. This actuates the solenoid T20 to operate the carriage return key and advance the paper the last line into position for the beginning of the following day's record. Operation of auxiliary switch T31 by solenoid T20 completes the circuit through D335, D3, T35, T36, D135, D1, stepping coil D401, etc., advancing the rotary switch to position 36. In position 36, a circuit is completed from bus 1 through D336, D3, T35, T34, D136, D1, stepping coil D401, etc., advancing the rotary switch D to position 37. In position 37, the circuit is completed from bus 1 through D337, D3, D137, D1, stepping coil D401, etc., advancing the rotary switch to the next position. This last sequence is repeated until the heading advance switch D reaches its zero or home position. In this position, the circuit is broken at arm D3, and the metering equipment is ready for the following day's operation.

It will be understood that the typewriter has a complete set of keys constituting a standard keyboard, and that any of the keys may be operated manually in the usual manner. Accordingly, the typewriter may be used for typing upon the forms desired notations or information additional to the readings automatically printed by the typewriter.

Figure 5:
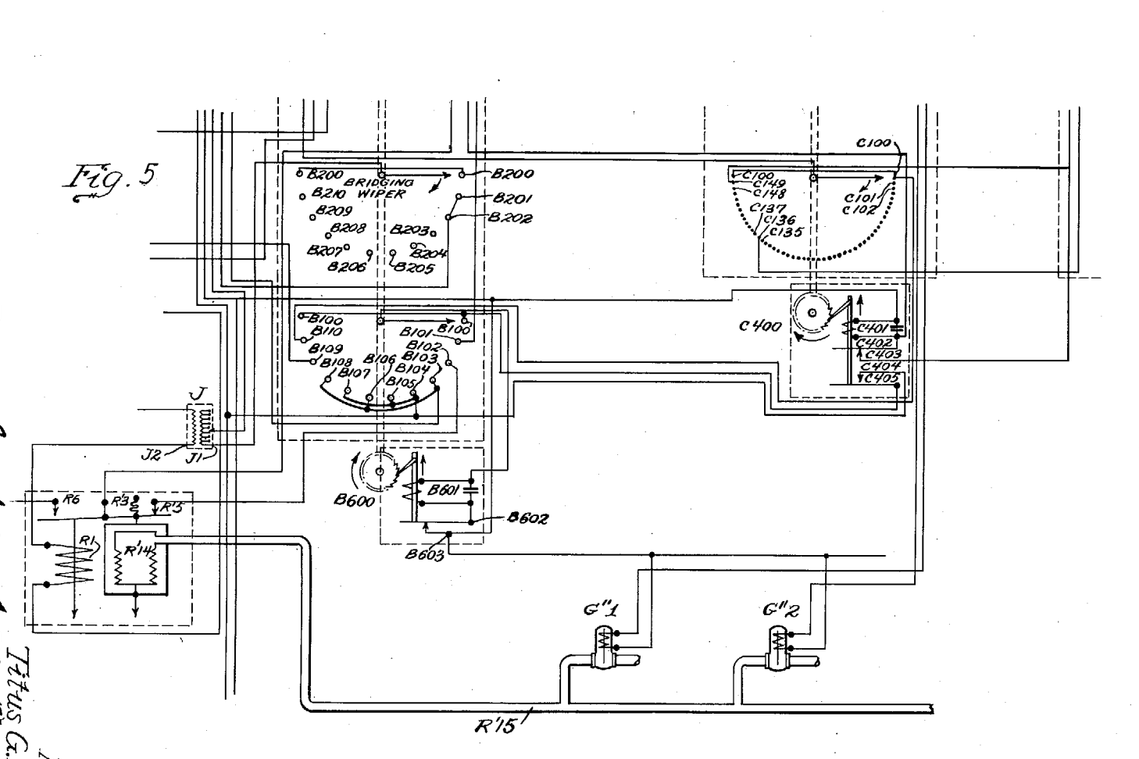
Figure 5 is a fragmentary diagram adapted for substitution in a portion of Figures 1 and 1A, for the purpose of showing a modified embodiment of the invention.

It also is often desirable to measure and record pressures within conduits for fluid under pressure. the diagram of Figure 5 showing my improved system adapted to such purpose. To accomplish this, the solenoid R2 may be replaced by a bellows or Sylpon R'14, acting in opposition to solenoid R1, from which bellows extends a header R'15. This header may be connected to the respective conduits through take-off tubes controlled by solenoid valves G''1, G''2, etc. under control of the selector switch C. This switch acts to admit fluid from the conduits successively to the bellows or Sylphon R'14, the pull then exerted by the latter being balanced against the pull exerted by solenoid R1, thus measuring and recording the pressures obtaining in the respective conduits, in substantially the same manner as the system measures and records desired characteristics of electric circuits. It will, of course, be understood that the recording instrumentality is, in this and each other case, appropriate to the purpose for which the system is used.

It will be clear from the above that the system of my invention is susceptible of numerous variations without departing from the field and scope thereof, and I intend to include all such variations, as fall within the scope of the appended claims, in this application in which the preferred form only of my invention has been disclosed.

I claim:

1. In an automatic printing metering system for making a printed record at regular time intervals of the instantaneous current values existing in each of a plurality of load circuits, the combination of measuring means for measuring said current values, selecting means for selectively connecting said measuring means with said different load circuits, and printing mechanism responsive to said measuring means comprising type characters operative to print numerical figures on a record sheet which are proportional to said current values, feeding means operated between printing cycles for causing relative motion between said type characters and said record sheet so as to print said figures aligned in one direction to correspond with said regular time intervals, and additional feeding means responsive to the operation of said selecting means for causing relative motion between said type characters and said record sheet so as to print said figures aligned in another direction to correspond with the different load circuits.

2. In an automatic printing metering system for making a printed record of the electrical characteristics existing at different times in each of a plurality of electrical circuits, the combination of measuring means for measuring said electrical characteristics, selecting means for selectively connecting said measuring means with said different electrical circuits, and printing mechanism responsive to said measuring means comprising supporting means adapted to support a record sheet, type characters operative to print numerical figures on said sheet which are proportional to said electrical characteristics, feeding means operative between printing cycles for causing relative motion between said type characters and said record sheet so as to print said figures aligned in one direction to correspond with said different times, and additional feeding means responsive to said selecting means for causing relative motion between said type characters and said record sheet so as to print said figures aligned in another direction to correspond with the different electrical circuits.

3. In an automatic printing metering system for making a printed record of the current values existing in each of a plurality of load circuits at regular time intervals, the combination of a balancing relay for measuring said current values, said relay comprising a plurality of coils acting in opposition, a rotary switch for selectively connecting one of said coils with said different load circuits, a second rotary switch operative to supply a variable current to another of said coils, which current is varied by said latter switch until said relay is approximately balanced, printing mechanism responsive to said latter switch comprising means adapted to support a record sheet, type characters operative to print figures on said sheet which constitute a measure of the magnitude of the current values in said load circuits, a plurality of electromagnets adapted to be selectively energized in determining the type characters to be printed, selecting means responsive to said second rotary switch for selectively controlling the energization of said electromagnets, a first feeding means responsive to one of said rotary switches for causing relative feeding motion between said type characters and said record sheet during each recording cycle in such direction as to print said figures on said sheet in horizontally spaced sequence corresponding to the different load circuits being measured, and a second feeding means operative pursuant to the completion of the printing operation along one horizontal row of said sheet for causing relative feeding motion between said type characters and said record sheet in such direction as to cause the printing operation in the next recording cycle to occur along another horizontal row of said sheet.

4. In a system for recording the values of a certain variable characteristic existing in a plurality of electrical circuits, the combination of measuring means for measuring said variable characteristic, means for establishing a coacting relation between said electrical circuits and said measuring means, printing mechanism responsive to said measuring means comprising type characters serving to print figures on a record sheet which are proportional to the characteristic to be measured, a plurality of electromagnets controlling said printing mechanism, said electromagnets being adapted to be selectively energized corresponding to the type characters to be printed, selecting switch means coacting with said measuring means for selectively controlling the energization of said electromagnets, a first automatic feeding means operated in succession with the successive printing impressions of each printing cycle for causing relative feeding motion between said type characters and said record sheet in one direction so that said printed figures are oriented with respect to one dimension of said sheet to correspond with the different electrical circuits being measured, and a second automatic feeding means operated between printing cycles for causing relative feeding motion between said type characters and said record sheet in another direction so that said printed figures are oriented with respect to another dimension of said sheet to correspond with different time periods.

5. In a printing metering system for a plurality of devices having varying characteristics which it is desired to record, the combination of measuring means for measuring said characteristics, selecting means for operatively associated said devices selectively with said measuring means for the performance of the measuring operations, and printing mechanism responsive to said measuring means comprising type characters operative to print figures on a record sheet which are proportional to the characteristics to be recorded, a first feeding means responsive to said selecting means for causing relative feeding motion between said record sheet and said type characters in such manner that the sequence of figures corresponding to different devices extends parallel to one dimension of said sheet, and a second feeding means operative between printing cycles for causing relative feeding motion between said record sheet and said type characters in such manner that the sequence of figures corresponding to different time intervals extends parallel to another dimension of said sheet.

6. In an automatic printing metering system, the combination of a balancing relay having in one element a current flowing therethrough, the instantaneous value of which is to be measured, and in the opposing element a current which is varied by steps, means for varying the current in said opposing element, a printing mechanism with figures selected by the actuation of said current varying means, means for printing by means of said printing mechanism on a record sheet figures which are proportional to the current in said opposing element at the time said relay balances, and means for causing said printing mechanism to operate substantially at the time said relay balances.

7. In an automatic printing metering system for recording the instantaneous current values of a plurality of circuits, the combination of a selector element which determines the circuit to be measured, a measuring element which balances the current to be measured against known currents, a printer which prints the figures which correspond to the value of the current, a clock to start the printing operation, and auxiliary apparatus including a sequence switch for causing the above operations to be performed in the proper order.

8. In apparatus for making a printed record of instantaneous electrical values in a plurality of line circuits at regular time intervals, the combination of a first selector switch for establishing connection with said line circuits in predetermined sequence, a balancing relay comprising a line coil and a balancing coil acting in opposition, said line coil being connected with said line circuits successively by said first selector switch, a second selector switch operative automatically to vary an electrical value through said balancing coil to establish a substantially balanced relation of said relay, printing means comprising a plurality of type characters and a plurality of electromagnets associated therewith adapted to be selectively energized for determining the type character to be printed, means responsive to said second selector switch for selecting the electromagnet to be energized, and means responsive to a balanced condition of said balancing relay for energizing the selected electromagnet.

9. In apparatus for making a printed record of instantaneous electrical values in a plurality of circuits at predetermined time intervals, the combination of a first selector switch for establishing connection with said circuits in predetermined sequence, a balancing relay comprising a circuit coil and a balancing coil acting in opposition, said circuit coil being connected with said circuits successively by said first selector switch, a second selector switch operative automatically to vary the electrical value of a circuit through said balancing coil to establish a substantially balanced relation of said relay, printing means comprising a plurality of type characters and a plurality of electromagnets controlling said printing mechanism, said electromagnets being adapted to be selectively energized corresponding to the type character to be printed, means responsive to the position of said second selector switch for selecting the electromagnet to be energized, means responsive to a balanced condition of said balancing relay for causing the selected electromagnet to be energized, and a third selector switch cooperating with said other selector switches for automatically controlling the sequence of operation of the apparatus.

10. In apparatus for making a printed record of the instantaneous electrical values in a plurality of circuits at predetermined time intervals, the combination of a first selector switch for establishing connection with said circuits in predetermined sequence, a balancing relay comprising a circuit coil and a balancing coil acting in opposition, said circuit coil being connected with said circuits successively by said first selector switch, a second selector switch operative automatically to vary the electrical value of a circuit through said balancing coil to establish a substantially balanced relation of said relay, printing means comprising a plurality of type characters, means responsive to the position of said second selector switch for selecting the type character to be printed, means responsive to a balanced condition of said balancing relay for causing the selected type character to be printed and a third selector switch cooperating with said other selector switches for automatically controlling the sequence of operation of the apparatus.

11. In apparatus for making a printed record of electrical values in a plurality of circuits at predetermined time intervals, said record being made on a record sheet, the combination of selecting means for selecting the circuits to be measured, measuring means for measuring the electrical values in the circuits selected, printing means responsive to said measuring means for printing characters on said sheet which are a direct measure of the electrical value in the circuit being measured, means responsive to the operation of the selecting means to cause relative horizontal movement between said sheet and said printing means to place successive printed impressions in successive columns corresponding to their respective circuits, and feeding means operative in response to the operation of the selecting means and at one end of the printing cycle for causing relative vertical movement between said sheet and said printing means to place the printed impressions in the proper rows corresponding to the time of recording.

12. In apparatus for making a printed record of electrical values in a plurality of circuits at predetermined time intervals, said record being made by printing figures on a record sheet with said figures aligned in one direction to correspond with individual circuits and in the other direction to correspond with predetermined time intervals, the combination of selecting means which select the circuit to be measured, measuring means for measuring the electrical values in the circuits as selected, type characters responsive to said measuring means for printing figures on said sheet which are a direct measure of the electrical values in the circuits being measured, and feeding means responsive to the operation of the selecting means for causing relative motion between said type characters and said record sheet in two directions to position the figures for circuits measured and times of recording.

13. In apparatus for making a printed record of electrical values in a plurality of circuits at predetermined time intervals, said record being made on a record sheet with the printed impressions grouped in vertical columns to correspond with individual circuits and in horizontal rows to correspond with predetermined time intervals, the combination of time responsive means for automatically initiating the operation of the apparatus at predetermined time intervals, measuring means for measuring the electrical values in the circuits as selected, printing means responsive to said measuring means for printing one or more numerical digits on said sheet which are a direct measure of the electrical value in the circuit being measured, automatic selecting means for selectively connecting the differential circuits with said measuring means, stepping means responsive to said selecting means for causing relative horizontal movement between said sheet and said printing means to place the printed impressions in the proper columns corresponding to their respective circuits, and advancing means operative in response to the operation of said selecting means at the completion of the printing cycle for vertically advancing said sheet to the next row.

14. In apparatus for making a printed record of electrical values in a plurality of electrical circuits at predetermined time intervals, the combination of time responsive means for automatically initiating the operation of the apparatus at predetermined time intervals, measuring means for measuring the electrical values in the circuits as selected, printing means responsive to said measuring means for printing on a record sheet numerical digits which are a direct measure of the electrical values in the circuit being measured, automatic selecting means including a step-by-step switch for selectively connecting the different circuits with said relay, and stepping means responsive to said automatic selecting means for causing relative motion between said printing means and said record sheet in two directions to place the printed impressions on the record sheet so that they will align in one dimension with respect to circuits measured and in the other dimension with respect to times of measurements.

15. In apparatus for making a printed record of the instantaneous current values existing in each of a plurality of load circuits at regular time intervals, said record being made on a record sheet, the combination of time responsive means for automatically initiating the operation of the apparatus at said regular time intervals, a first multi-point switch comprising means for maintaining the apparatus in operation after the actuation of said time responsive means, measuring means characterized by a balancing relay comprising a plurality of coils acting in opposition, means responsive to said first multi-point switch for selectively connecting said load circuits with one of said coils, a second multi-point switch comprising means for supplying an increasing current to another of said coils until said relay is substantially balanced, printing means comprising a plurality of type characters selected by said second multi-point switch and operative to print one or more numerical digits on said sheet which are a direct measure of the instantaneous current value in the load circuit being measured, stepping means operating automatically between printing impressions for causing relative horizontal movement between said sheet and said printing means to place the printed impressions in the proper columns corresponding to their respective circuits, and automatic advancing means operative after the completion of the printing cycle along one horizontal row of said sheet to advance the sheet to bring another horizontal row thereof into printing position.

16. In apparatus for making a printed record of electrical values in a group of circuits at spaced time intervals, said record being made on a sheet with the printed impressions arranged in linear relation parallel to one dimension of the sheet to correspond with individual circuits, and arranged in linear relation parallel to another dimension of the sheet to correspond with the times of recording, the combination of selecting means for selecting the circuits, measuring means for measuring the electrical values in the circuits selected, printing means responsive to said measuring means for printing characters on said sheet which are a direct measure of the electrical value in the circuit being measured, stepping means operative in response to the recording of the electrical values in the several circuits for causing relative movement between said sheet and said printing means in such direction as to place the printed impressions in the proper linear relation corresponding to their respective circuits, and advancing means operative by the completion of printing the electrical values in said group of circuits at one time of recording for causing relative movement between said sheet and said printing means in such direction as to place succeeding printed impressions in the proper linear relation corresponding to the succeeding time of recording.

17. In a printing system of the class described for a plurality of devices having characteristics which it is desired to record, the combination of automatic selecting means for automatically selecting the device of which a characteristic is to be recorded, measuring means for measuring said characteristic, said selecting means operatively connecting the selected device with said measuring means, a recorder comprising type characters operative to print figures on a record sheet, means responsive to said measuring means for selecting the type character to be printed, printing means automatically set into operation upon the completion of the measuring operation for impressing the selected type character against the record sheet, a first feeding means for causing relative movement between said sheet and said type characters to place successive printed impressions in alignment in one direction corresponding to the respective devices being measured, means for automatically actuating said first feeding means in predetermined relation to the operation of said printing means, a second feeding means for causing relative movement between said sheet and said type characters to place the printed impressions in alignment in a second direction corresponding to the time of recording, and means for automatically actuating said second feeding means pursuant to the completion of the printing operation.

18. In an automatic printing metering system of the class described for recording the instantaneous electrical values of a plurality of circuits, the combination of time responsive means for initiating a measuring and printing cycle, selector means operative upon the initiation of said cycle to select the several circuits in sequence, measuring means for measuring the instantaneous electrical value in each circuit thus selected, a recorder comprising a plurality of type characters adapted to make printed impressions on a record sheet, means responsive to said measuring means for selecting type characters corresponding to a suitable measure of the instantaneous electrical value thus measured, printing means for making the printed impression of the selected type character, stepping means responsive to said selector means for causing relative stepping movements between said sheet and said type characters in one direction, and advancing means operative between printing cycles for causing relative advancing movements between said sheet and said type characters in another direction.

19. In an automatic printing metering system for making a printed record at regular time intervals of the fluid pressures existing in each of a plurality of conduits, chambers or the like, the combination of measuring means for measuring said fluid pressures, selecting means for selectively connecting said measuring means with said different conduits, chambers or the like, and printing mechanism responsive to said measuring means comprising type characters operative to print numerical figures on a record sheet which are proportional to said fluid pressures, feeding means operative between printing cycles for causing relative motion between said type characters and said record sheet so as to print said figures aligned in one direction to correspond with said regular time intervals, and additional feeding means responsive to said selecting means for causing relative motion between said type characters and said record sheet so as to print said figures aligned in another direction to correspond with the different conduits, chambers or the like.

20. In apparatus for making a printed record of the varying characteristics of a plurality of devices, which characteristics it is desired to record at predetermined time intervals, said record being made by printing figures on a record sheet with said figures aligned in one direction to correspond with the different devices and in the other direction to correspond with predetermined time intervals, the combination of selecting means which selects the device to be measured, measuring means for measuring the varying characteristics in the devices as selected, type characters responsive to said measuring means for printing figures on said sheet which are a direct measure of the varying characteristics in the devices being measured, and feeding means responsive to the operation of said selecting means for causing relative motion between said type characters and said record sheet in two directions to position the figures for devices measured and times of recording.

21. In an automatic system for measuring and recording the fluid pressures existing in each of a plurality of conduits, chambers or the like, the combination of measuring apparatus adapted to respond to said fluid pressures, said measuring apparatus comprising electrically energized balancing means and metering means governing a current flow to said balancing means in the measuring operations, selecting means for selectively connecting said measuring apparatus with said different conduits, chambers or the like, a recorder comprising a plurality of type characters adapted to make printed impressions on a record sheet, means responsive to said measuring apparatus for selecting type characters corresponding to a suitable measure of the fluid pressure thus measured, printing means for making the printed impression of the selected type character, stepping means responsive to said selecting means for causing relative stepping movements between said record sheet and said type characters in one direction, and advancing means operative between printing cycles for causing relative movement between said sheet and said type characters in another direction.

TITUS G. LE CLAIR.